Aug. 2, 1949.  W. P. DWYER  2,478,091
MECHANICAL HOBBYHORSE
Filed Dec. 1, 1945  2 Sheets-Sheet 1

INVENTOR,
William P. Dwyer
BY Roy E. Hamilton,
Attorney.

Aug. 2, 1949.  W. P. DWYER  2,478,091
MECHANICAL HOBBYHORSE
Filed Dec. 1, 1945  2 Sheets-Sheet 2
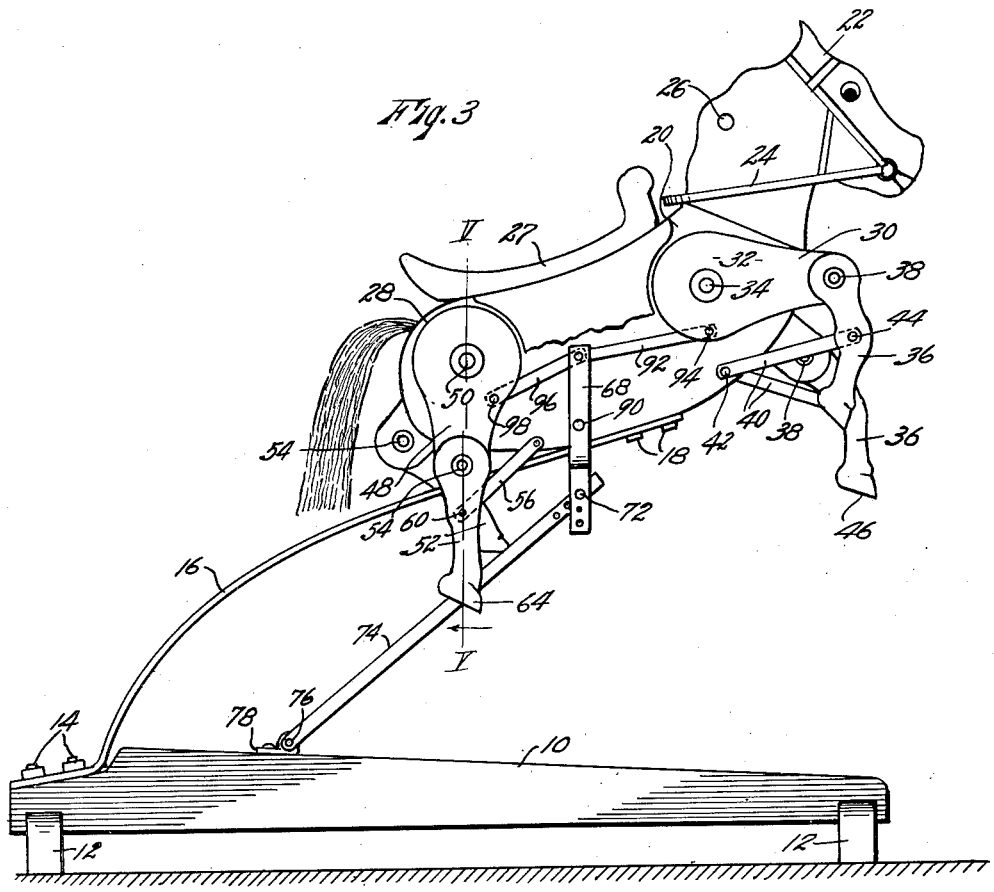
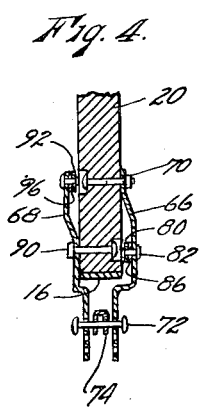
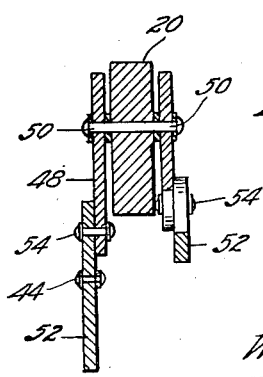
INVENTOR,
William P. Dwyer.
BY
Roy E. Hamilton,
Attorney.

Patented Aug. 2, 1949

2,478,091

UNITED STATES PATENT OFFICE 2,478,091

MECHANICAL HOBBYHORSE

William P. Dwyer, Kansas City, Mo.

Application December 1, 1945, Serial No. 632,205

5 Claims. (Cl. 272—55)

This invention relates to improvements in mechanical hobby horses of the spring type.

The principal object of this invention is the provision of a hobby horse so constructed and operated as to simulate the trotting of a horse.

Other objects are sturdiness and economy of construction, ease and efficiency of operation, and adaptability for indoor or outdoor use.

With these objects in view as well as other objects which will appear during the course of the specification, reference will now be had to the drawings wherein Figure 1 is a side elevation, partly broken away, of a hobby horse embodying this invention.

Fig. 3 is a side elevation of the hobby horse showing the reverse side to that shown in Figure 1, and with parts broken away.

Fig. 4 is a fragmentary sectional view taken on line IV—IV of Figure 1.

Fig. 5 is a fragmentary sectional view taken on line V—V of Figure 3.

Figure 1:
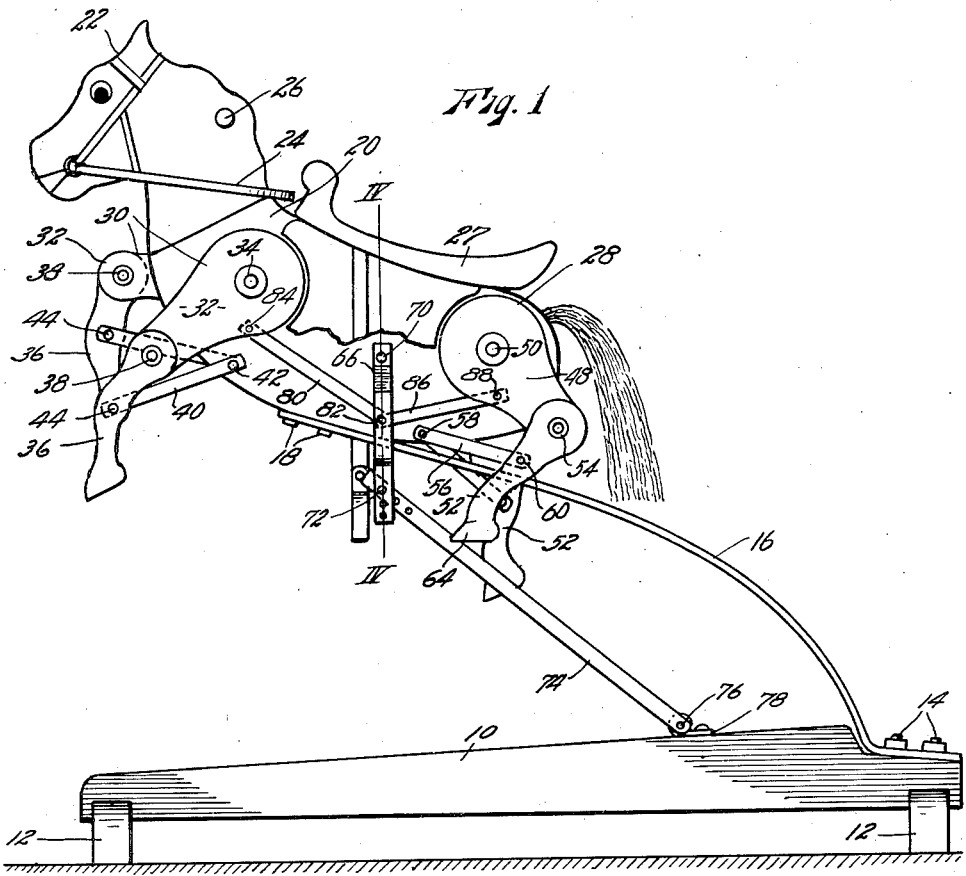
Figure 2:
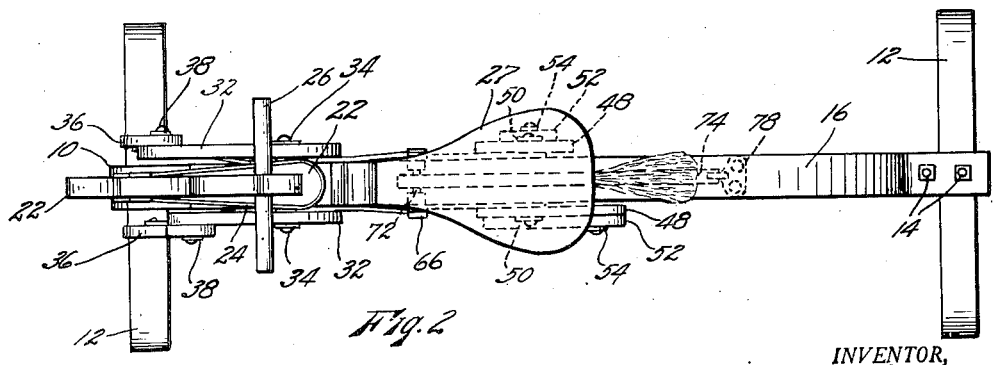
Fig. 2 is a plan view of the hobby horse shown in Figure 1 with parts omitted to more clearly show the movable parts.

Throughout the several views like reference characters refer to similar parts and the numeral 10 designates a longitudinal base bar mounted on transverse legs or blocks 12 which extend outwardly from each side of the bar to stabilize it against rocking movement. Mounted on one end of bar 10 by means of bolts 14 is a formed leaf spring 16 which extends forwardly and upwardly above bar 10 to point adjacent the front end thereof. This leaf spring is secured by means of screws 18 to the belly of the body 20 of a horse, so as to support said body directly over the base bar 10, and substantially parallel therewith. This body is provided with a head 22, to which are attached reins 24 which extend rearwardly over the body of the horse adjacent the front end of saddle 27. A hand bar 27 is mounted through the neck of the horse and securely attached thereto and provides a hand grip at each side of the neck for the rider to grasp. The horse is provided with a pair of rear legs 28 and a pair of front legs 30. Each front leg has a forearm 32 pivoted at the shoulder of the body member by pin 34. Each of the front legs has a shank 36 which is pivoted at the knee joint by means of pivot 38. A bar 40 pivoted at 42 to the lower side of the body member 20 and to the rear of shank 36 is pivoted at 44 to the inside of said shank intermediate the pivotal point 38 and the foot 46, thus permitting a rocking movement of shank 36 about pivot 44 as the bar moves about its pivot 42.

Each of the rear legs 28 has a gaskin 48 secured to the hip of the horse body by means of pin 50. The downwardly extending shank 52 is pivoted to the gaskin 48 by means of pin 54. A bar 56 pivoted at 58 to the lower side of the body member 20 in front of leg 28 extends rearwardly and is pivoted to shank 52 by pin 60, intermediate pin 54 and foot 64. This attachment of the rear shank is substantially the same as the attachment of the front shank.

When the child mounts the horse and bounces up and down thereon, the spring 16 will permit the horse to move downwardly to a point adjacent bar 10 and to return back to the upper position. This up and down movement which is produced more or less by the arching of spring 16 is utilized to operate the horse's legs in the desired sequence and relative relation to the body of the horse. To obtain this movement, rocker arm 66 on the left side of the horse and 68 on the right side of the horse are provided. Rocker arm 66 is pivoted at its one end at 70 to the horse body 20 and is connected adjacent its lower end by cross pin 72 to operating bar 74 which is pivoted at 76 to a bracket 78 secured to the base bar adjacent its rear end. This operating bar extends forwardly and upwardly to meet the rocker arm 66 and as the horse is caused to move upwardly and downwardly by the action of the rider, the rocker arm 66 will be oscillated relative to the body of the horse. Operating link 80 is connected by pin 82 intermediate the opposite ends of rocker arm 66, and by pin 84 to the forearm 32 of the front leg, in spaced relation below the pivot 34. Also, link 86 is connected at its one end to arm 66 by pin 82 and at its other end to gaskin 48 by means of pin 88 which is positioned intermediate the pivots 50 and 54.

It is quite apparent that as the rocker arm 66 is oscillated relative to the body member the legs 28 and 30 will be given reverse motions such as obtained when a horse trots. The greater the up and down movement of the horse, the more pronounced the leg movement.

Referring now to Figure 3 which shows the right side of the horse, the forearm of the front leg 30 is pivoted by pivot 34 which preferably extends through the body of the horse. Pivot 38 interconnects the forearm with the shank 36, and this foreleg is constructed in substantially like manner as the foreleg previously described and has the bar 40 by means of which it is attached to the body member by pin 42. The rear leg 28 is mounted in like manner as the opposite rear leg, having the common pivot 50 and a like connecting bar 56. The rocker arm 68 differs from rocker arm 66 in that it is pivoted at 90 adjacent its center portion and is connected with operating bar 74 by means of cross pin 72. The upper end of this arm is connected with bar 92 which is pivoted at 94 to the foreleg of said right hind leg as shown.

It will be noted that the levers 66 and 68 have different fulcrums but both are operated by the same pin 72.

By referring to Figure 4 it will be observed that this pin is loosely fitted in said arms to permit of some variation in the degree of movement of the two rocker arms as the legs on the opposite sides of the horse are operated in reverse directions. In other words, as the legs on the left side of the horse are moved forwardly, the legs on the opposite side of the horse will be moving rearwardly. Due to the looseness of the connecting parts there is no tendency to interfere with the free movement of the parts as the horse is moved upwardly and downwardly.

What I claim as new and desire to protect by Letters Patent is:

1. A hobby horse comprising a base; a leaf spring secured at its one end to said base; a horse body secured to the free end of said leaf spring above said base; pivotally jointed legs pivoted to said body; bars pivotally interconnecting the intermediate portions of the shanks of said legs to the said horse body; and means operable as said horse body is moved toward and from said base to cause said legs to move relative to said body to simulate trotting.

2. A hobby horse comprising a supporting base; a leaf spring secured at its one end to said base; a horse body secured to the free end of said leaf spring above said base; a pair of pivotally jointed front legs pivoted to the shoulders of said horse body; a pair of pivotally jointed hind legs pivoted to the thighs of said horse body; a bar operatively interconnecting the intermediate portion of the shanks of each of said legs to said horse body for arcuate movement relative thereto; rocker arms pivoted to said horse body and extending therebelow; an operating bar pivoted at its lower end to said base and at its upper end to said rocker arms; and a link interconnecting the upper portion of each of said legs to one of said rocker arms whereby as said horse body is moved toward and from said base said legs will be moved relative to the horse body.

3. A hobby horse comprising a supporting base; a leaf spring secured at its one end to said base; a horse body secured to the free end of said leaf spring above said base; a pair of pivotally jointed front legs pivoted to the shoulders of said horse body; a pair of pivotally jointed hind legs pivoted to the thighs of said horse body; a bar operatively interconnecting the intermediate portion of the shanks of each of said legs to said horse body for arcuate movement relative thereto; a rocker arm pivoted to each side of said horse's body, intermediate the front and hind leg thereof and extending therebelow; an operating bar pivoted at its one end to said base and at its other end to the lower portion of said rocker arms; links pivotally interconnecting the rocker arm on one side of said body above its pivotal point to the upper portion of the adjacent front and hind legs; and links pivotally interconnecting the rocker arm on the other side of the body below its pivotal point to the upper portion of the adjacent front and hind leg, whereby when said body is moved toward and from said base said legs will be moved relative to the horse's body to simulate a trotting movement.

4. A hobby horse comprising a base; a leaf spring secured at its one end to said base; a horse body secured to the free end of said leaf spring above said base; pivotally jointed legs pivoted to said body; bars pivotally interconnecting the intermediate portions of the shanks of said legs to the said horse body; means including rocker arms pivoted to said horse body, a link pivotally interconnecting each of said legs to one of said rocker arms and an operating bar pivoted to said base and to said rocker arms, whereby as said horse body is moved toward and from said base said legs will be moved relative to said horse body.

5. A hobby horse comprising a supporting base; a leaf spring secured at its one end to said base; a horse body secured to the free end of said leaf spring directly above said base; a pair of pivotally jointed front legs pivoted to the shoulders of said horse body; a pair of pivotally jointed hind legs pivoted to the thighs of said horse body; a bar operatively interconnecting the intermediate portion of the shanks of each of said legs to said horse body for arcuate movement relative thereto; a rocker arm pivoted to each side of said horse's body intermediate the front and hind leg thereof and extending therebelow; an operating bar pivoted at its one end to said base and at its other end to said rocker arms; links pivotally interconnecting the rocker arm on one side of said body above its pivotal point to the upper portion of the adjacent front and hind legs and below the pivotal point thereof; and links interconnecting the rocker arm on the other side of the body below its pivotal point to the upper portion of the adjacent front and hind leg and below the pivotal point thereof, whereby when said body is moved toward and from said base said legs will be moved relative to the horse's body to simulate a trotting movement.

WILLIAM P. DWYER.

REFERENCES CITED

The following references are of record in the file of this patent:

UNITED STATES PATENTS

| Number | Name | Date |
| --- | --- | --- |
| 1,512,972 | Zsarney | Oct. 28, 1924 |